United States Patent [19]

Bujalski et al.

[11] Patent Number: 4,824,918

[45] Date of Patent: Apr. 25, 1989

[54] METHOD OF PRODUCING SILICON CARBIDE PRECERAMIC VINYL-CONTAINING POLYMERS

[75] Inventors: Duane R. Bujalski, Bay City; Gary E. LeGrow; Jonathan Lipowitz, both of Midland, all of Mich.; Thomas F. Lim, Cuyahoga, Ohio

[73] Assignee: Dow Corning Corporation, Midland, Mich.

[21] Appl. No.: 93,434

[22] Filed: Sep. 4, 1987

[51] Int. Cl.$^4$ .......................................... C08F 283/00
[52] U.S. Cl. .................................. 525/479; 525/474; 528/10; 556/430; 556/480
[58] Field of Search .................. 528/10; 525/474, 479; 556/430, 480

[56] References Cited

U.S. PATENT DOCUMENTS

| Re. 31,447 | 11/1983 | Baney et al. |
|---|---|---|
| 4,260,780 | 4/1981 | West |
| 4,298,559 | 11/1981 | Baney et al. |
| 4,310,651 | 1/1982 | Baney et al. |
| 4,314,956 | 2/1982 | Baney et al. |
| 4,546,163 | 10/1985 | Haluska |
| 4,595,472 | 6/1986 | Haluska |
| 4,639,501 | 1/1987 | Seyferth et al. |

OTHER PUBLICATIONS

Baney, et al.; "Methylchloropolysilane & Derivatives Prepared from the Redistribution of Methylchlorodisilates"; 1983, 2, 859; ORGANOMETALLICS.
West et al.; "Polysilane High Polymers as Precursors to Silicon Carbide"; (1984), 25, 4,; POLYM. PREPR.

*Primary Examiner*—Melvyn I. Marquis
*Attorney, Agent, or Firm*—James E. Bittell

[57] ABSTRACT

Vinyl-containing polysilanes are described wherein the vinyl groups are attached to endblocking sites of intermediate reactivity. These vinyl-containing polysilanes are prepared by reacting a halogen-endblocked polysilane with, first, a non-vinyl-containing Grignard reagent or a non-vinyl organolithium compound whereby the most reactive halogen endblocking groups are replaced; then, second, reacting the resulting polysilane with vinyl Grignard reagent or vinyllithium whereby the halogen endblocking groups of intermediate reactivity are replaced; and, third, reacting the resulting polysilane with a non-vinyl-containing Grignard reagent or a non-vinyl organolithium compound whereby the least reactive halogen endblocking groups are replaced. The vinyl-containing polysilanes can be coverted to ceramic materials, including ceramic fibers, by pyrolysis.

26 Claims, No Drawings

METHOD OF PRODUCING SILICON CARBIDE PRECERAMIC VINYL-CONTAINING POLYMERS

STATEMENT OF GOVERNMENT RIGHTS

The United States Government has rights in this invention pursuant to Contract Number F33615-83-C-5006 awarded by the United States Air Force.

BACKGROUND OF THE INVENTION

This invention relates to vinyl-containing polysilanes of the general formula $$[RSi][R_2Si]$$

where there are present 0 to 60 mole percent of $[R_2Si]$ units and 40 to 100 mole percent of [RSi] units, and to vinyl-containing polysilanes of the general formula $$[RSi][R_2Si][R''Si]$$

where there are present 0 to 40 mole percent $[R_2Si]$ units, 0.1 to 99.9 mole percent [RSi] units, and 0.1 to 99.9 mole percent [R''Si] units, where R is an alkyl radical containing 1 to 8 carbon atoms, where R'' is selected from the group consisting of alkyl radicals containing at least six carbon atoms, phenyl radicals, and radicals of the formula $A_yX_{(3-y)}Si(CH_2)_z-$ where A is a hydrogen atom or an alkyl radical containing 1 to 4 carbon atoms, y is an integer equal to 0 to 3, X is chlorine or bromine, and z is an integer greater than or equal to 1, where the remaining bonds on silicon are attached to other silicon atoms, —R' groups, and vinyl radicals, where R' is an alkyl group containing 1 to 8 carbon atoms or a phenyl radical, where the —R' and vinyl groups are endblocking groups, and where the —R' groups are attached both to the most reactive and the least reactive endblocking sites and the vinyl groups are attached to the endblocking sites of intermediate reactivity. These vinyl-containing polysilanes are prepared by reacting a chlorine- or bromine-endblocked polysilane of general formula $$[RSi][R_2Si],$$

where there are present 0 to 60 mole percent $[R_2Si]$ units and 40 to 100 mole percent [RSi] units, or a chlorine- or bromine endblocked polysilane of general formula $$[RSi][R_2Si][R''Si]$$

where there are present 0 to 40 mole percent $[R_2Si]$ units, 0.1 to 99.9 mole percent [RSi] units, and 0.1 to 99.9 mole percent [R''Si] units where R is an alkyl radical containing 1 to 8 carbon atoms, where R'' is selected from the group consisting of alkyl radicals containing at least six carbon atoms, phenyl radicals, and radicals of the formula $A_yX_{(3-y)}Si(CH_2)_z-$ where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and bromine or chlorine atoms, with, first, a Grignard reagent of general formula R'MgX' or an organolithium compound of general formula R'Li, followed with, second, a vinyl-containing Grignard reagent of general formula $(CH_2=CH)MgX'$ or vinyllithium, followed with, third, a Grignard reagent of general formula R'MgX' or an organolithium reagent of general formula R'Li under carefully controlled reaction and process conditions where R' is an alkyl radical with 1 to 8 carbon atoms or a phenyl radical and X' is chlorine, bromine, or iodine whereby both the most reactive and the least reactive endblocking sites are occupied by —R' groups and the endblocking sites of intermediate reactivity are occupied by vinyl groups. The reaction conditions must be carefully controlled to ensure that the vinyl groups, which are incorporated into the polysilane via a derivatization reaction, survive the reaction and processing steps intact. The order of the derivatization reactions, whereby the chlorine- or bromine-endblocking groups are replaced by —R' and vinyl endblocking groups, is used to ensure that the vinyl groups occupy endblocking sites of intermediate reactivity.

This invention also relates to a method of preparing such polysilanes under carefully controlled conditions to ensure the vinyl groups survive the reaction process and occupy endblocking sites of intermediate reactivity. This invention further relates to the silicon carbide ceramics prepared from such vinyl-containing polysilanes. The vinyl-containing polysilanes of this invention may be rendered infusible by exposure to UV irradiation in an inert atmosphere prior to pyrolysis to form ceramic material. Such cure mechanisms can result in ceramic materials containing only limited amounts of oxygen. The vinyl-containing polysilanes of this invention can also be cured in oxygen containing atmospheres but the resulting ceramic material obtained from such air cured polymers will contain increased amounts of oxygen.

Ceramic fibers prepared from the vinyl-containing polysilanes of this invention have very high tensile strengths. Furthermore, the stiochiometry of silicon and carbon in the ceramic material can be readily controlled by variations in the amounts of —R' and vinyl groups in the vinyl-containing polysilane.

Haluska in U.S. Pat. Nos. 4,546,163 (issued Oct. 8, 1985) and 4,595,472 (issued June 17, 1986) claimed to produce vinyl-containing polysilanes by a redistribution mechanism by reacting various disilanes and vinyl-containing silanes in the presence of a redistribution catalyst. More careful work has now determined that the vinyl group itself is not incorporated into the resulting polysilane under the reaction conditions employed. The polysilanes of Haluska from the redistribution reaction of disilanes and vinyl silanes do not contain vinyl groups. This is illustrated in Comparative Example 1 infra.

Haluska in the just mentioned patents also claimed that the vinyl content of his "vinyl-containing" polysilanes could be increased by reacting the "vinyl-containing" polysilane with a vinyl Grignard reagent or vinyllithium. However, it has now been determined that under the conditions Haluska employed during isolation of the end product (i.e. temperatures between 200° and 250° C.) that the vinyl groups will not survive. This is illustrated in Comparative Example 2 infra.

Based on these observations, it is clear that the alleged "vinyl-containing" polysilanes of U.S. Pat. Nos. 4,546,163 and 4,595,472 do not contain vinyl groups. In the examples of both patents, the vinyl content was merely calculated based on the initial reactants and the analyzed by-products using the assumption that any unaccounted vinyl groups must have been incorporated into the polymer. The vinyl content was not determined experimentally. As indicated in Comparative Example 1 infra, NMR analysis confirms the absence of vinyl groups in polysilanes prepared by the Haluska method.

This present invention differs from that of Haluska in that the reaction and process conditions under which a chlorine or bromine endblocked polysilane and a vinyl Grignard reagent or vinyllithium are reacted are carefully controlled to ensure the survival of the vinyl groups in the resulting polysilane. The present invention results in vinyl-containing polysilanes which are useful in preparing ceramic materials. The polysilanes of Haluska lack the desired vinyl groups. The presence of vinyl groups in the polysilanes of the present invention are confirmed by NMR analysis. Furthermore, in the present invention the vinyl endblocking groups occupy endblocking sites of specific reactivity. This allows these vinyl-containing polysilanes to have a softening temperature below the temperature that the vinyl groups will thermally crosslink. The vinyl-containing polysilanes of this invention can be melt spun to form fibers, cured by UV irradiation, and then pyrolyzed to yield ceramic fibers.

Bujalski, et al. in a copending application entitled "A Method of Producing Silicon Carbide Preceramic Polymers," which was filed the same day as this application and which is hereby incorporated by reference, disclosed a method of preparing vinyl-containing polysilanes by reaction of a chlorine- or bromine-endblocked polysilane with (CH$_2$=CH)MgX or (CH$_2$=CH)Li. These vinyl-containing polysilanes have softening points above the temperature at which the vinyl crosslinking reaction becomes dominant. Thus these vinyl-containing polysilanes will cure before they melt; this makes it very difficult to melt spin these polysilanes. In the present invention, the softening temperature has been reduced below the crosslinking temperature of the vinyl groups by controlling the reactivity of endblocking sites occupied by the vinyl groups. Therefore, the vinyl-containing polysilanes of the present invention can be easily formed into fibers by melt spinning, cured by UV irradiation, and then converted into ceramic fibers by pyrolysis.

Baney et al. in U.S. Pat. No. 4,310,651 (issued Jan. 12, 1982) disclosed a polysilane of general formula

[CH$_3$Si][(CH$_3$)$_2$Si]

where there was present 0 to 60 mole percent [(CH$_3$)$_2$Si] units and 40 to 100 mole percent [CH$_3$Si] units and where the remaining bonds on silicon were attached to other silicon atoms and chlorine atoms or bromine atoms. The polysilane was converted to a beta-silicon carbide containing ceramic at elevated temperatures (about 1400° C.). The polysilanes of U.S. Pat. No. 4,310,651 generally are difficult to handle due to their high reactivity in air.

Baney et al. in U.S. Patent 4,298,559 (issued Nov. 3, 1981) prepared polysilanes of general formula

[CH$_3$Si][(CH$_3$)$_2$Si]

where there was present 0 to 60 mole percent [(CH$_3$)$_2$Si] units and 40 to 100 mole percent {CH$_3$Si] units and where the remaining bonds on silicon were attached to other silicon atoms and additional alkyl radicals of 1 to 4 carbon atoms or phenyl radicals. Upon heating, these polysilanes were converted into silicon carbide containing ceramics in high yields.

Baney et al. in U.S. Patent Re. No. 31,447 (reissued Nov. 22, 1983) disclosed polysilanes of the general formula

[CH$_3$Si][(CH$_3$)$_2$Si]

where there was present 0 to 60 mole percent [(CH$_3$)$_2$Si] units and 40 to 100 mole percent [CH$_3$Si] units and where the remaining bonds on silicon were attached to other silicon atoms and alkoxy radicals containing 1 to 4 carbon atoms or phenoxy radicals. Silicon carbide ceramics were obtained by firing these polysilanes to elevated temperatures.

Baney et al. in U.S. Pat. No. 4,314,956 (issued Feb. 9, 1982) disclosed polysilanes of the general formula

[CH$_3$Si][(CH$_3$)$_2$Si]

where there was present 0 to 60 mole percent [(CH$_3$)$_2$Si] units and 40 to 100 mole percent [CH$_3$Si] units and where the remaining bonds on silicon were attached to silicon and amine radicals of the general formula —NHR$^{vi}$ where R$^{vi}$ is a hydrogen atom, an alkyl radical of 1 to 4 carbon atoms or a phenyl radical. A silicon carbide ceramic was obtained by firing this polysilane to an elevated temperature under an inert atmosphere or under an ammonia atmosphere.

The just discussed U.S. Pat. Nos. 4,310,651, 4,298,599, Re. No. 31,447, and 4,314,956 are hereby incorporated by reference. These polysilanes are further discussed in Baney et al. Organometallics, 2, 859 (1983).

West in U.S. Pat. No. 4,260,780 (issued Apr. 7, 1981) prepared a polysilane of general formula

[(CH$_3$)$_2$Si][CH$_3$(C$_6$H$_5$)Si]

by the sodium metal reduction of dimethyldichlorosilane and methylphenyldichlorosilane. The resulting polysilanes had very high softening points (>280° C.).

West et al. in Polym. Prepr., 25, 4 (1984) disclosed the preparation of a polysilane of general formula

[CH$_3$(CH$_2$=CHCH$_2$)Si][CH$_3$(C$_6$H$_5$)Si]

by the sodium metal reduction of allylmethyldichlorosilane and methylphenyldichlorosilane. These polysilanes were rapidly gelled by irradiation with ultraviolet light.

Seyferth et al. in U.S. Pat. No. 4,639,501 (issued Jan. 27, 1987) prepared preceramic polymers by reacting a methylpolysilane of the general formula [(RSiH)$_x$-(RSi)$_y$]$_n$ with an organosilicon compound having at least two vinyl groups of the general formula [R$_2$(CH$_2$=CH)Si]$_2$Y, where, for example, Y is O, S, NH, NR, or is absent, using either UV irradiation, thermal energy, or catalysts.

It has now been determined that polysilanes of the general formula

[RSi][R$_2$Si]

or of the general formula

[RSi][R$_2$Si][R''Si]

which contain vinyl groups as endblocking groups in sites of intermediate reactivity may be prepared in good yield. The presence of vinyl groups in the polysilanes is confirmed experimentally. These polysilane may be pyrolyzed at elevated temperatures in an inert atmosphere to produce silicon carbide-containing ceramics. The polysilanes may be cured by exposure to UV irradiation prior to the pyrolysis step. These polysilanes may also be melt spun, cured by UV irradiation, and pyrolyzed at elevated temperatures in an inert atmosphere to produce silicon carbide-containing ceramic fibers which have very high tensile strengths.

THE INVENTION

This invention relates to a method of preparing a vinyl-containing first polysilane having the general formula $$[RSi][R_2Si]$$

where there are present 0 to 60 mole percent [$R_2Si$] units and 40 to 100 mole percent [RSi] units, where R is an alkyl radical containing 1 to 8 carbon atoms, and where the remaining bonds on silicon are attached to other silicon atoms, —R' groups, and vinyl groups, where R' is an alkyl group containing 1 to 8 carbon atoms or a phenyl group, and where the R' groups are attached to both the most reactive and the least reactive endblocking sites and the vinyl groups are attached to the endblocking sites of intermediate reactivity, said method consisting of reacting under anhydrous conditions in the presence of a solvent a second polysilane with chlorine or bromine endblocking groups of general formula $$[RSi][R_2Si]$$

where there are present 0 to 60 mole percent $R_2Si$ units and 40 to 100 mole percent [RSi] units, where R is an alkyl radical containing 1 to 8 carbon atoms, and where the remaining bonds on silicon are attached to other silicon atoms and chlorine or bromine atoms with (1) a Grignard reagent of general formula R'MgX' or an organolithium compound of general formula R'Li at a temperature of 0° to 120° C., followed by reaction with (2) a vinyl-containing Grignard reagent of general formula (CH$_2$=CH)MgX' or vinyllithium at a temperature of 0° to 120° C., followed by reaction with (3) a Grignard reagent of general formula R'MgX' or an organolithium reagent of general formula R'Li at a temperature of 0° to 120° C. where R' is an alkyl radical with 1 to 8 carbon atoms or a phenyl radical and X' is chlorine, bromine, or iodine whereby both the most reactive and the least reactive endblocking sites are occupied by —R' groups and the endblocking sites of intermediate reactivity are occupied by vinyl groups.

This invention also relates to a method of preparing a vinyl-containing first polysilane having the general formula $$[RSi][R_2Si][R''Si]$$

where there are present 0 to 40 mole percent [$R_2Si$] units, 0.1 to 99.9 mole percent [RSi] units, and 0.1 to 99.9 mole percent [R''Si] units, where R is an alkyl radical containing 1 to 8 carbon atoms, where R'' is selected from the group consisting of alkyl radicals containing at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms, —R' groups, and vinyl groups, where R' is an alkyl group containing 1 to 8 carbon atoms or a phenyl group, and where the R' groups are attached to both the most reactive and the least reactive endblocking sites and the vinyl groups are attached to the endblocking sites of intermediate reactivity, said method consisting of reacting under anhydrous conditions in the presence of a solvent a second polysilane with chlorine or bromine endblocking groups of general formula $$[RSi][R_2Si][R''Si]$$

where there are present 0 to 40 mole percent [$R_2Si$] units, 0.1 to 99.9 mole percent [RSi] units, and 0.1 to 99.9 mole percent [R''Si] units, where R is an alkyl radical containing 1 to 8 carbon atoms, where R'' is selected from the group consisting of alkyl radicals containing at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and chlorine or bromine atoms with (1) a Grignard reagent of general formula R'MgX' or an organolithium compound of general formula R'Li at a temperature of 0° to 120° C., followed by reaction with (2) a vinyl-containing Grignard reagent of general formula (CH$_2$=CH)MgX' or vinyllithium at a temperature of 9° to 120° C., followed by reaction with (3) a Grignard reagent of general formula formula R'MgX' or an organolithium reagent of general formula R'Li at a temperature of 0° to 120° C. where R' is an alkyl radical with 1 to 8 carbon atoms or a phenyl radical and X' is chlorine, bromine, or iodine whereby both the most reactive and the least reactive endblocking sites are occupied by —R' groups and the endblocking sites of intermediate reactivity are occupied by vinyl groups.

This invention also relates to a method of preparing a silicon carbide-containing ceramic article, said method comprising (A) forming an article of the desired shape from a vinyl-containing polysilane of the general formula $$[RSi][R_2Si]$$

in which polysilane there are from 0 to 60 mole percent [$R_2Si$] units and 40 to 100 mole percent [RSi] units, where R is an alkyl radical containing 1 to 8 carbon atoms and where the remaining bonds on silicon are attached to other silicon atoms, —R' groups, and vinyl groups where R' is an alkyl radical containing 1 to 8 carbon atoms or a phenyl radical and where both the most reactive and the least reactive endblocking sites are occupied by —R' groups and the endblocking sites of intermediate reactivity are occupied by vinyl groups; (B) curing the article formed in step (A) by exposure to UV irradiation; and (C) heating the cured article of step (B) in an inert atmosphere or in a vacuum to a temperature greater than 800° C. until the polysilane is converted to a silicon carbide-containing ceramic article.

This invention also relates to a method of preparing a silicon carbide-containing ceramic article, said method comprising (A) forming an article of the desired shape from a vinyl-containing polysilane of the general formula

[RSi][R₂Si][R"Si]

in which polysilane there are from 0 to 40 mole percent [R₂Si] units, 0.1 to 99.9 mole percent [RSi] units, and 0.1 to 99.9 mole percent [R"Si] units, where R is an alkyl radical containing 1 to 8 carbons atoms, where R" is selected from the group consisting of alkyl radicals containing at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms, —R' groups, and vinyl groups where R' is an alkyl radical containing 1 to 8 carbon atoms or a phenyl radical and where both the most reactive and the least reactive endblocking sites are occupied by —R' groups and the endblocking sites of intermediate reactivity are occupied by vinyl groups; (B) curing the article formed in step (A) by exposure to UV irradiation; and (C) heating the cured article of step (B) in an inert atmosphere or in a vacuum to a temperature greater than 800° C. until the polysilane is converted to a silicon carbide-containing ceramic article.

The chlorine- or bromine-endblocked polysilane starting materials useful for preparing the vinyl-containing polysilanes of this invention may be prepared by reacting a mixture of one or more chlorine- or bromine-containing disilanes with about 0.1 to 10 weight percent of a catalyst at a temperature of about 100° to 340° C. while distilling by-produced volatile materials. This polysilane is of general formula

[RSi][R₂Si]

and contains 0 to 60 mole percent of [R₂Si] units and 40 to 100 mole percent of [RSi] units where R is an alkyl radical containing 1 to 8 carbon atoms and where the remaining bonds on silicon are attached to other silicon atoms and bromine or chlorine atoms. A preferred polysilane starting material is of general formula

[CH₃Si][(CH₃)₂Si]

and contains 0 to 60 mole percent of [(CH₃)₂Si] units and 40 to 100 mole percent of [CH₃Si] units and where the remaining bonds on silicon are attached to other silicon atoms and chlorine atoms. The procedures of preparing such polysilanes are well known in the art. It is generally preferred that the chlorine- or bromine-endblocked polysilane starting materials useful for preparing the vinyl containing polysilanes of this invention be prepared by reacting a mixture of one or more chlorine- or bromine-containing disilanes with about 0.1 to 10 weight percent of a catalyst at a temperature of about 220° to 240° C. The preparation of the chlorine- or bromine-endblocking polysilane starting materials at these low temperatures generally provides, after the process of the this invention, a vinyl-containing polysilane which has better spinning characteristics for fiber production.

The chlorine- or bromine-containing disilanes useful in preparing the chlorine- or bromine-endblocked polysilanes are of the average formula

[R_cX_dSi]₂ where R is an alkyl radical containing from 1 to 8 carbon atoms, c has a value of 0 to 2.5, d has a value of 0.5 to 3, the sum (c+d) equals three, and X is chlorine or bromine. R in the above disilane may be methyl, ethyl, propyl, butyl, pentyl, hexyl, heptyl, and octyl. It is generally preferred that R is an alkyl radical containing 1 to 4 carbon atoms; it is most preferred that R is a methyl radical. The R radicals are not required to be the same. For example, the majority of the R radicals could be methyl radical with the remainder being n-octyl radicals. Examples of such disilanes include (CH₃)₂ClSiSiCl(CH₃)₂, CH₃Cl₂SiSiCl(CH₃)₂, CH₃Cl₂SiSiCl₂CH₃, (CH₃)₂BrSiSiBr(CH₃)₂, CH₃Br₂SiSiBr(CH₃)₂, CH₃Br₂SiSiBr₂CH₃ and the like. Preferably in the above disilane R is a methyl radical and X is chlorine. The disilane can be prepared from the approriate silanes or the disilane can be utilized as it is found as a component of the process residue from the direct synthesis of organochlorosilanes. The direct synthesis of organochlorosilanes involves passing the vapor an oganic chloride over heated silicon and a catalyst. See Eaborn, "Organosilicon Compounds," Butterworths Scientific Publications, 1960, page 1. The disilane CH₃Cl₂SiSiCl(CH₃)₂ is found in large quantities in the residue from the reaction and therefore, this Direct Process Residue (DPR) is a good starting material for obtaining the polysilane polymer used in this invention.

Monosilanes may be added to the mixture of disilanes used to prepare the polysilanes useful in this invention. Suitable monoorganosilanes are of formula R"SiX₃ where R" is selected from the group consisting of alkyl radicals of at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1. The A radicals in the formula $A_yX_{(3-y)}Si(CH_2)_z$— may be the same or different. Preferably, z is an integer from 1 to 10 and most preferably, z is an integer equal to 1, 2, or 3. Examples of suitable monoorganosilanes include phenyltrichlorosilane, n-hexyltrichlorosilane, n-octyltrichlorosilane, phenyltribromosilane, n-octyltribromosilane, Cl₃SiCH₂CH₂SiCl₃, CH₃Cl₂SiCH₂CH₂SiCl₃, (CH₃)₂ClSiCH₂CH₂SiCl₃, H(CH₃)₂SiCH₂CH₂SiCl₃, and the like. Phenyltrichlorosilane and n-octyltrichlorosilane are the preferred monoorganosilanes. The use of such monosilanes are described in more detail in copending U.S. patent application Ser. No. 945,126 filed Dec. 22, 1986 and which is hereby incorporated by reference. Using monosilanes in the disilane mixture results in polysilanes of the general formula

[R₂Si][RSi][R"Si]

where R is an alkyl radical containing 1 to 8 carbon atoms and R" is selected from the group consisting of alkyl radicals of at least six carbon atoms, phenyl radicals, and radicals of the formula $A_yX_{(3-y)}Si(CH_2)_z$— where A is a hydrogen atom or an alkyl radical containing 1 to 4 carbon atoms, y is an integer equal to 0 to 3, X is chlorine or bromine, and z is an integer greater than or equal to 1, and there are from 0 to 40 mole percent [R₂Si] units, 0.1 to 99.9 mole percent [RSi] units, and 0.1 to 99.9 mole percent [R"Si] units and wherein the remaining bonds on silicon are attached to either other silicon atoms, chlorine atoms, or bromine atoms. Preferably these polysilanes contain from 0 to 40 mole percent [R$_2$Si] units, 40 to 99 mole percent [RSi] units, and 1 to 30 mole percent [R"Si] units. Most preferably these polysilanes contain from 0 to 10 mole percent [R$_2$Si] units, 80 to 99 mole percent [RSi] units, and 1 to 20 mole percent [R"Si] units. The chlorine-containing polysilanes are preferred in the practice of this invention.

In order to prepare the starting chlorine or bromine endblocked polysilane, the chlorine- or bromine-containing disilanes are reacted in the presence of a rearrangement catalyst. Suitable rearrangement catalysts include ammonium halides, tertiary organic amines, quaternary ammonium halides, quaternary phosphonium halides, hexamethylphosphoramide and silver cyanide. Preferred catalyst includes quaternary ammonium halide having the formula R*$_4$NX, quaternary phosphonium halides having the formula R*$_4$PX, and hexamethylphosphoramide where R* is an alkyl radical containing 1 to 6 carbon atoms or a phenyl radical and X is chlorine or bromine.

The amount of catalyst utilized can range from 0.001 to 10 weight percent and preferably from 0.1 to 10 weight percent based on the weight of the starting disilane. The catalysts and starting materials require anhydrous conditions and therefore one must take care to insure that moisture is excluded from the reaction system when the disilanes and catalyst are mixed. Generally this can be done by using a stream of dry nitrogen or argon as a cover over the reaction mixture.

The disilane or mixture of disilanes are reacted in the presence of 0.1 to 10 weight percent of a rearrangement catalyst at a temperature of 100° to 340° C. while distilling by-produced volatile materials until there is produced the chlorine- or bromine-containing starting material polysilane of this invention. The order of mixing the reactants is not critical. Preferably the reaction temperature is from 150° to 250° C. and most preferably from 220° to 240° C. Typically the reaction is carried out for about 1 to 48 hours although other time durations may be employed.

Typically the chlorine- or bromine-endblocked polysilane will contain from about 10 to 38 weight percent hdyrolyzable chlorine or 21 to 58 weight percent hydrolyzable bromine where the percentages are based on the weight of the polysilane.

As has been described in the prior art, these chlorine- or bromine-endblocked polysilanes may be pyrolyzed in an inert atmosphere or in a vacuum to obtain a silicon carbide ceramic material. However, the reactivity of the chlorine or bromine endblocking groups makes the handling of these polysilanes difficult. Replacement of the chlorine or bromine endblocking groups with vinyl groups, as described in the copending application of Bujalski et al. entitled "A Method of Producing Silicon Carbide Preceramic Polymers," results in reactive polysilanes which can only be melt spun with great difficulty becuase of their increased ability to crosslink. Often melt spinning is impossible with such polysilanes because crosslinking is generally complete before the softening temperature is reached.

It has now been found that a sequential replacement of the chlorine or bromine endblocking groups, first by —R' groups, then by vinyl groups, and finally by —R' groups, where R' is an alkyl radical containing 1 to 8 carbon atoms or a phenyl radical, results in polysilanes of controllable reactivity. These polysilanes can be melt spun, cured by UV irradiation, and then fired to elevated temperatures under a inert atmosphere to produce high strength ceramic fibers.

In the practice of this invention the most reactive chlorine or bromine endblocking groups are replaced by —R' groups; next the chlorine or bromine endblocking groups of intermediate reactivity are replaced by vinyl groups; finally, the remainder of chlorine or bromine endblocking groups, those of least reactivity, are replaced by —R' groups. By such a procedure a vinyl-containing polysilane of the desired reactivity can be obtained. By placing vinyl groups only on sites of intermediate reactivity, the vinyl groups in the resulting polysilanes are not sufficiently reactive to thermally cure at temperatures below the softening or melting point of the polysilane but are sufficiently reactive to allow the polysilane to be UV curable. An analogy to "Goldilocks and the Three Bears" is almost unavoidable: Relative to placement of the vinyl groups, the most reaactive endblocking sites are too reactive, the least reactive endblocking sites are too unreactive, but the intermediate reactivity sites are "just right."

The most reactive chlorine or bromine endblocking sites are replaced by —R' groups by reacting the chlorine or bromine endblocked polysilane with either a Grignard reagent of general formula R'MgX' or an organolithium compound of general formula R'Li where R' is an alkyl radical of 1 to 8 carbon atoms or a phenyl radical and X' is chlorine, bromine or iodine. It is generally preferred that the first 10 to 40 weight percent of the replaceable chlorine or bromine endblocking groups be replaced by R' groups. It is more preferred that the first 25 to 40 weight percent of the replaceable chlorine or bromine endblocking groups be replaced by R' groups. It is most preferred that about the first one-third of the replaceable chlorine or bromine endblocking groups be replaced by R' groups.

In the practice of this first step a mixture of a Grignard reagent R'MgX' or organolithium compound R'Li with either vinyl Grignard or vinyllithium may be used so long as the vinyl-containing compound comprises less than about 25 mole percent of the mixture. For example, the first step could be carried out using a mixture of 75 to 100 mole percent CH$_3$MgCl and 0 to 25 mole percent (CH$_2$=CH)MgBr. Such a procedure allows for only a limited number of vinyl groups in the most reactive sites and thus will give vinyl-containing polysilanes of higher reactivity relative to vinyl-containing polysilanes where no vinyl groups are added in the first step. But by limiting the amount of vinyl groups present in the first step, the resulting vinyl-containing polysilanes are still sufficiently unreactive overall as to be melt spinable. By using limited vinyl-containing reactants in the first step, one can tailor make a vinyl-containing polysilane by the practice of this invention with a reactivity suitable for the application in mind. Determining the optimum reactivity for a given application can be done experimentally. Throughout this specification, when we talk of placing R' groups on the most reactive sites we mean to include the possibility of placing both R' and vinyl groups on the most reactive sites as described in this paragraph.

After replacement of the most reactive chlorine or bromine endblocking sites with R' groups, the endblocking sites of intermediate reactivity are replaced by vinyl groups by reacting the polysilane obtained in the first step with either (CH$_2$=CH)MgX' or (CH$_2$=CH)Li. It is generally preferred that about 30 to 70 weight percent of the replaceable chlorine or bromine, based on the total initial amount of replaceable chorine or bromine present in the polysilane, be replaced by vinyl groups in this second step of the sequential replacement process. It is more preferred that about 40 to 60 weight percent of the replaceable chlorine or bromine endblocking groups be replaced by vinyl groups. It is most preferred that about one-half of the replaceable chlorine or bromine endblocking groups be replaced by vinyl groups.

After replacement of the chlorine or bromine endblocking groups of intermediate reactivity with vinyl groups, the remaining replaceable chlorine or bromine endblocking groups are replaced with R' groups by reacting the vinyl-containing polysilane from the second step with either R'MgX' or R'Li where R' and X' are defined above. Generally about 10 to 20 weight percent of the replaceable chlorine or bromine endblocking groups will be replaced by R' groups in this final step.

Each derivatization step should be essentially complete before beginning the next derivatization step. It is not necessary to isolate each derivatized product before beginning the next derivitazation step.

Generally not all the chlorine or bromine in the polysilane will be replaced by either R' or vinyl groups. This residual chlorine or bromine does not generally effect later processing steps. It is preferred, however, that the chlorine or bromine content of the vinyl-containing polysilane of this invention be kept as low as possible.

The vinyl and R'-substituted Grignard reagents useful in this invention are well known in the art. Typical Grignard reaction solvents can be used herein. Preferred are alkyl ethers and tetrahydrofuran. For the first and third sequential replacement steps, a R'MgX' Grignard reagent may be used. R' may be a methyl, ethyl, propyl, butyl, pentyl, hexyl, heptyl, octyl, or phenyl group. Generally, $(CH_3)MgX'$ is preferred to replace the most and least reactive chlorine or bromine groups with methyl groups.

Vinyllithium and the organolithium compounds are also well known in the art. Suitable solvents include toluene, xylene, benzene, tetrahydrofuran and ethers. For the first and third sequential replacement steps, a R'Li compound may be used. R' may be a methyl, ethyl, propyl, butyl, pentyl, hexyl, heptyl, octyl, or phenyl group. Generally, $(CH_3)Li$ is the organolithium compound preferred to replace the most and least reactive chlorine or bromine groups with methyl groups.

Whether the replacement in the first and third steps is carried out by R'MgX' or R'Li, it is preferred that R' is a methyl group. Generally, $(CH_3)MgX'$ is the preferred reactant for the most and least reactive endblocking sites.

For best results, dry reaction conditions should be observed for each of the sequential reaction steps. Solvents for the starting chlorine- or bromine-endblocked polysilane can be any organic solvent in which the material is soluble and which does not react with the material except in the desired manner. Examples of useful solvents include toluene, xylene, benzene, tetrahydrofuran, and ethers. Specifically, toluene is preferred.

Generally it has been found preferable in the first step to add the chlorine- or bromine-endblocked polysilane to the desired Grignard reagent or organolithium compound, both in a solvent solution. The amount of Grignard reagent or organolithium compound employed in the first step should be that amount required to react with the desired amount of the most reactive endblocking sites. Generally, the amount of Grignard reagent or organolithium present is equivalent to about 10 to 40 weight percent of the replaceable chlorine or bromine in the polysilane. It is preferred that the amount of Grignard reagent or organolithium compound used in the first step be equivalent to about 25 to 40 weight percent of the replaceable chlorine or bromine endblocking groups present in the polysilane. It is most preferred that the amount of Grignard reagent or organolithium compound used in the first step be equivalent to about 25 to 40 weight percent of the replaceable chlorine or bromine endblocking groups present in the polysilane. It is most preferred that the amount of Grignard reagent or organolithium compound used in the first step be equivalent to about 33 weight percent of the replaceable chlorine or bromine endblocking groups present in the polysilane. This addition and reaction is carried out while the materials are stirred or otherwise agitated. The reaction is carried out in a dry inert atmosphere such as in the presence of nitrogen or argon gas to prevent the introduction of water into the reaction vessel. The reaction can be run at temperatures of 0° to 120° C. but preferably the reaction is run at room temperature or slightly below room temperature to prevent or decrease undesirable side reactions. After the addition of the reagent is complete, the reaction mixture is stirred for a time, with or without heating, to ensure the completion of the reaction. Typically the reaction is carried out for a time period of about 1 to 48 hours.

It is not necessary to isolate the partially R'-endblocked polysilane of step one before proceeding on to the vinyl replacement reaction of step two. The vinyl Grignard reagent or vinyllithium in a solvent may merely be added to the reaction mixture of step one after sufficient chlorine or bromine groups have been replaced by R' groups in step one. Generally, the amount of vinyl Grignard reagent or vinyllithium added is equivalent to about 30 to 70 weight percent of the replaceable chlorine or bromine in the starting polysilane. It is preferred that the amount of vinyl Grignard or vinyllithium employed in this second step be equivalent to about 40 to 60 weight percent of the replaceable chlorine or bromine endblocking groups present in the starting polysilane. It is most preferred that the amount of vinyl Grignard or vinyllithium compound used in this second step be equivalent to about 50 weight percent of the replaceable chlorine or bromine endblocking groups present in the starting chlorine or bromine-endblocking polysilane. As before, this addition and reaction is carried out while the materials are stirred or otherwise agitated. The reaction is carried out in a dry inert atmosphere such as in the presence of nitrogen or argon gas to prevent the introduction of water into the reaction vessel. The reaction can be run at temperatures of 0° to 120° C. but preferably the reaction is run at room temperature or slightly below room temperature to prevent or decrease undesirable side reactions. After the addition of the reagent is complete, the reaction mixture is stirred for a time, with or without heating, to ensure the completion of the reaction. Typically the reaction is carried out for a time period of about 1 to 48 hours.

It is not necessary to isolate the partially derivatized polysilane of step two before proceeding with the final step. The organo Grignard reagent or organolithium compound in a solvent may merely be added to the reaction mixture of step two after sufficient chlorine or bromine groups have been replaced by vinyl groups in step two. The amount of organo Grignard reagent or organolithium compound should be in excess of the remaining, replaceable chlorine or bromine endblocking groups. As before, this addition and reaction is carried out while the materials are stirred or otherwise agitated. The reaction is carried out in a dry inert atmosphere such as in the presence of nitrogen or argon gas to prevent the introduction of water into the reaction vessel. The reaction can be run at temperatures of 0° to 120° C. but preferably the reaction is run at room temperature or slightly below room temperature to prevent or decrease undesirable side reactions. In any event, to ensure the survival of the vinyl groups, the temperature must not exceed abut 150° C. After the addition of the reagent is complete, the reaction mixture is stirred for a time, with or without heating, to ensure the completion of the reaction. Typically the reaction is carried out for a time period of about 1 to 48 hours. Excess Grignard reagent or organolithium compound is then destroyed using water, HCl, or an alcohol. The reaction mixture is cooled to room temperature, then filtered by conventional means, and the solvents and other volatile materials are then removed by stripping under vacuum at temperatures generally less than the softening point of the resulting polysilane.

The resulting polysilanes are generally solids with softening temperatures in the range of about 40° to 80° C. The vinyl-containing polysilanes still contain some chlorine or bromine but the content of the chlorine or bromine groups is substantial reduced relative to that of the starting chlorine- or bromine-endblocked polysilane.

The vinyl-containing polysilanes of this invention may be fired in an inert atmosphere or in a vacuum to a temperature of at least 800° C. until a silicon carbide ceramic material is obtained. Preferably the pyrolysis temperature is 100° C. or higher. Most preferably the pyrolysis temperature is 1200° to 1500° C.

The polysilanes may be formed into shaped articles prior to pyrolysis. Fibers are one especially preferred shaped article. Fibers can be prepared by conventional melt spinning or dry spinning procedures. Melt spinning is preferred.

The vinyl-containing polysilanes of this invention may be cured by exposure to ultraviolet (UV) light prior to pyrolysis. Curing by exposure to UV light is made possible by the presence of the vinyl group which, in the polysilanes, has a maximum UV absorption in the general 200 to 245 nm range. Toluene solubility may be used as a screening test for a determination of dosage rates and UV exposure times required. The uncured polysilane is soluble in toluene whereas the cured, infusible polysilane is insoluble or mostly insoluble in toluene. The polysilanes of this invention may be cured by UV irradiation either in an inert atmosphere or in air. If a ceramic material with reduced oxygen content is desired then curing by UV irradiation in an inert atmosphere is obviously preferred. UV curing can be carried out in two stages if desired. First the fibers can be exposed to UV irradiation as they are being formed but before they are collected on a take-up spool. This curing is referred to as "on-line" curing. With the equipment currently available to the inventors, the on-line curing is not sufficient to render the fibers infusible so that they can survive the pyrolysis step without first melting or at least matting. In some cases, even though the fibers were matted after pyrolysis with only an on-line UV cure, the fibers were sufficiently cured so that they could be separated. But the on-line curing is sufficient to prevent the fibers from sticking together on the take up reel. The fibers on the take up reel can then be treated with additional UV irradiation to cure the fibers so that they can withstand pyrolysis, and conversion into ceramic materials, without loosing their shape. With UV sources specifically designed for more effective on-line fiber curing, the second UV irradiation step is not likely to be required.

The following examples are intended to illustrate the invention and are not intended to limit the invention. In the following examples, the analytical methods used were as follows:

Percent chlorine was determined by fusion with sodium peroxide and potentiometric titration with silver nitrate. Carbon, hydrogen, and nitrogen were determined on a C, H, N Elemental Analyzer, Model 240-XA1106, manufactured by Control Equipment Corporation of Lowell, Massachusetts. Oxygen was determined using a Leco Oxygen Analyzer equipped with an Oxygen Determinator 316 (Model 783700) and an Electrode Furnace EF100 (Model 77600) manufactured by Leco Corporation, St. Joseph, Mich. The method includes the high temperature carbothermic reduction to CO with CO analysis by IR. Percent silicon was determined by a fusion technique which consisted of converting the silicon material to soluble forms of silicon and then analyzing the soluble material quantitatively for total silicon by atomic absorption spectrometry.

The softening temperature was determined on a Thermomechanical Analyzer, Model 940, from Dupont Instruments. Thermogravimetric analyses (TGA) were carried out on a OmniTherm TGA instrument manufactured by OmniTherm Corporation, Arlington Heights, Ill.

The polysilanes were fired to elevated temperature using an Astro Industries Furnace 1000A (water cooled graphite heated model 1000.3060-FP-12) or a Lindberg furnace (model 54434).

NMR spectra were recorded on a Model EM-390 NMR spectrometer from Varian Associates of Palo Alto, California. The polysilane's vinyl content was calculated from the integrated intensities of the proton NMR.

The UV source was a Porta-Cure UV Irradiator, Model 1500F from American Ultraviolet Company.

The physical properties of the ceramic fibers were determined using a Instron Testing Machine Model 1122 from Instron Corporation of Canton, Mass. The gauge length was one inch in all cases.

Throughout the examples the methyl Grignard reagent used was $CH_3MgCl$ and the vinyl Grignard reagent was $(CH_2{=}CH)MgBr$.

COMPARATIVE EXAMPLE 1

A mixture of 414.0 g (1.9 moles) methylchlorodisilanes, 21.8 g (0.107 moles) phenylvinyldichlorosilane, and 4.4 g (0.015 moles) tetrabutylphosphonium bromide catalyst were reacted under argon using the basic procedure used in U.S. Pat. No. 4,595,472. The methylchlorodisilane used was redistilled direct process residue which contained about 50 weight percent $CH_3Cl_2SiSiCL_2CH_3$, 36 weight percent $(CH_3)_2ClSiSiCl_2CH_3$, 12 weight percent $(CH_3)_2ClSiSiCl(CH_3{}_2$, and 2 weight percent low boiling silanes. The catalyst was from Alfa Products, Danvers, Mass. The reaction mixture was heated from room temperature to 100° C. at 5° C./min, 100° C. at 110° C. at 2° C./min, held at 110° C. for 17 minutes, 110° C. to 120° C. at 2° C./min, and 120° C. to 250° C. at 3° C./min. Throughout the heating process volatile byproducts were distilled from the reaction mixture and collected. Samples of both the reaction mixture and the byproducts were collected throughout the reaction for NMR and GC analysis. The following results were obtained: the reaction mixture at 50° C. had a vinyl/phenyl molar ratio of 0.91 by NMR; at 100° C. the vinyl/phenyl molar ratio was 0.88; at 110° C. the vinyl/phenyl molar ratio was 0.86; at 150° C. the vinyl/phenyl molar ratio was 0.90; at 200° C. the vinyl/phenyl molar ratio was 0.73 and the volatile material contained methylchlorodisilanes and phenylvinyldichlorosilane; at 250 the total reaction mixture had a vinyl/phenyl molar ratio of 0.11, the liquid portion of the reaction mixture (about 5 percent of the total reaction mixture) had a vinyl/phenyl molar ratio of 0.40, and the liquid portion contained methylchlorodisilanes and 1.4 weight percent phenylvinyldichlorosilane; and the total distillate contained dimethyldichlorosilane, methyldichlorosilane, and methylchlorodisilanes. Up to 150° C. the vinyl-phenyl moral ratio was approximately constant at about 0.9. The loss of vinyl groups, as indicated by the reduction in the vinyl/phenyl ratio, began between 150° and 200° C. At 250° C. very little of the vinyl remained; from the GC analysis it appears that most of the remaining vinyl is in unreacted phenylvinyldichlorosilane and not in the polysilane. Therefore, it is clear that vinyl groups are not incorporated into the polysilane as claimed by Haluska in U.S. Pat. Nos. 4,546,163 and 4,595,472.

COMPARATIVE EXAMPLE 2

Several polysilanes were prepared and reacted with a mixture of methyl and vinyl Grignard reagents as in Example 1 except that the relative amounts of methyl and vinyl Grignard reagents were varied. Run (A) employed 0.118 moles of $CH_3MgCl$ and 0.479 moles $(CH_2=CH)MgBr$ with a vinyl/methyl molar ratio of 4.1; run (B) employed 0.181 moles $CH_3MgCl$ and 0.420 moles $(CH_2=CH)MgBr$ with a vinyl/methyl molar ratio of 2.3; and run (C) employed 0.224 moles $CH_3MgCl$ and 0.339 moles $(CH_2=CH)MgBr$ with a vinyl/methyl molar ratio of 1.5. The solvent was removed in the same manner as in Example 1 except that the final stripping conditions were varied as follows: for run (A), the polysilane was stripped at 220° C. for two minutes at 70 mm Hg; for run (B), the polysilane was stripped 180° C. for 12 minutes at 20 mm Hg; and for run (C), the polysilane was stripped at 200° C. for 14 minutes at 20 mm Hg. In each case the polymer gelled; the resulting products contained essentially no surviving vinyl groups. The polysilanes were not soluble in common organic solvents. Because of the insolubility of the gelled polysilanes the loss of vinyl groups could not be directly confirmed by NMR. This example demonstrates that excessive temperatures can cause the loss of vinyl groups where significant numbers of vinyl groups are placed on endblocking sites of the highest reactivity.

EXAMPLE 1

A polysilane was prepared by reacting a mixture of 436.0g (2.0 moles) methylchlorodisilanes, 6.2g (0.025 moles) n-octyltrichlorosilane, and 4.4 g (0.013 moles) tetrabutylphosphonium bromide catalyst under argon by heating the mixture to 230° C. at a rate of 2.0° C./min while removing volatile byproducts using the basic procedure used in U.S. Pat. No. 4,595,472. The methylchlorodisilanes were the same as used in Comparative Example 1. A polysilane was obtained in 20.3 percent yield.

Derivatization Step One: The polysilane (89.9 g, 0.506 moles chlorine) was dissolved in toluene (300 g) cooled with an ice water bath. Methyl Grignard reagent, $CH_3MgCl$, (0.18 moles, 3.0M) in tetrahydrofuran was added dropwise over about a one minute time period under an argon atmosphere. The temperature rose to about 50° C. The mixture was then cooled to room temperature. Derivatization Step Two: Vinyl Grignard reagent, $(CH_2=CH)MgBr$, (0.28 moles, 1.0M) in tetrahydrofuran was added over a six minute period under an argon atmosphere; the temperature rose to about 40° C. The temperature was raised to about 90° C. over about 16 minutes and then cooled to room temperature. Derivatization Step Three: Methyl Grignard reagent, $CH_3MgCl$, (0.10 moles, 3.0M) in tetrahydrofuran was added over about 30 seconds under an argon atmosphere. The temperature was raised to about 100° C. over about 30 minutes and then cooled to room temperature. After cooling to room temperature the mixture was quenched with 68 ml of a saturated, aqueous $NH_4Cl$ solution. The organic layer was collected, dried with anhydrous $MgSO_4$, and filtered through a 0.1 micron filter. The solvent was removed by first distilling at atmospheric pressure and then a vacuum strip at 200° C. for 5 minutes at 50 mm Hg. A solid vinyl-containing polysilane (58.5g, 70.7 percent yield) was obtained which contained 45.0 percent silicon, 34.0 percent carbon, 7.88 percent hydrogen, 0.9 percent chlorine, and 4.7 percent vinyl. The oxygen content was not determined. The polysilane had a softening temperature of 55° C., and a viscosity of 320 poise at 150° C.

A bulk polysilane sample was pyrolyzed to 1200° C.; the resulting ceramic material contained 0.7 percent oxygen and 4.4 percent chlorine.

Fibers were prepared from the vinyl-containing polysilane by melt spinning at 140° to 145° C. through a ten mil spinneret. Fibers were exposed to UV irradiation immediately after exiting the spinneret (on-line curing) and then collected on a take up reel. Fibers on the take up reel were shielded from UV irradiation used in the on-line curing. The total length of the UV on-line exposure chamber was 18 cm; by varying the take up reel speed, the UV exposure time could be varied. After collection on the take up reel, the fibers could be further cured ("post curing") by a batch UV procedure; a small bundle of fibers were cured by additional UV exposure by either (1) exposure of the bundle placed horizontally to UV irradiation from one UV light source ("one-sided batch cure") or (2) exposure of a vertically mounted bundle to UV irradiation from the four compass directions by moving the UV light source around the bundle ("four-sided batch cure").

Green fibers (diameter of about 16 microns) were cured online with a residence time of 0.11 seconds. The on-line cured fibers were then subjected to several different post cure regimes. Sample 1-A received no further UV irradiation. Sample 1-B received 6 minutes of one-sided cure irradiation. Sample 1-C received 24 minutes (6 minutes each side) of four-sided cure irradiation. The various fiber samples were then pyrolyzed to 1200° C. at a rate of 3.0° C./min under an argon atmosphere to produce ceramic fibers. Ceramic fibers from 1-A were somewhat fused after pyrolysis but could be separated into individual fibers (average diameter of 11.7 microns; tensile strenth of 157 Ksi; and modulus of 27.9 Msi). Ceramic fibers from 1-B were slightly fused after pyrolysis but could be separated into individual fibers (average diameter of 12.1 microns; tensile strength of 180 Ksi; and modulus of 26.3 Msi). Ceramic fibers from 1-C were very slightly fused after pyrolysis but could be separated into individual fibers (average diameter of 12.2 microns; tensile strength of 222 Ksi; and modulus of 27.1 Msi). Good quality fibers were produced in each case.

EXAMPLE 2

The starting polysilane was prepared as in Example 1 except that the reaction mixture contained 1178.3 g (5.4 moles) methylchlorodisilanes, 66.5 g (0.27 moles) n-octyltrichlorosilane, and 12.5 g (0.037 moles) tetrabutylphosphonium bromide catalyst under argon and the reaction mixture was heated to 250° C. at a rate of 1.5° C./min while removing volatile byproducts. A polysilane ws obtained in 19.7 percent yield.

The three step devivatization process was carried out as in Example 1. In the first step, the polysilane (122 g, 0.688 miles chlorine) was reacted with methyl Grignard reagent (17.9 g, 0.240 moles); in the second step, with vinyl Grignard reagent (26.2 g, 0.200 moles); and in the third step, with methyl Grignard reagent 20.2 g, 0.270 moles). The resulting vinyl-containing polysilane was treated as in Example 1 except that it was finally stripped at 160° C. and 20 mm Hg for 10 minutes. A solid vinyl-containing polysilane (88.9 g, 80.6 percent yield) was obtained which contained 44.0 percent silicon, 32.4 percent carbon, 6.72 percent hydrogen, 5.4 percent chlorine, and 2.0 percent vinyl. The oxygen content was not determined. The polysilane had a softening temperature of 38° C., a weight average molecular weight of 1683, a number average molecular weight of 1079, and a viscosity of 16 poise at 150° C. A bulk polysilane sample was pyrolyzed to 1200° C.; the resulting ceramic material contained 65.3 percent silicon, 29.2 percent carbon, undetectable hydrogen, 1.7 percent oxygen, and 2.7 percent chlorine.

EXAMPLE 3

A polysilane was prepared as in Example 1 except that the reaction mixture contained 645 g (3.0 moles) methylchlorodisilanes, 24.7 g (0.10 moles) n-octyltrichlorosilane, and 6.5 g (0.019 moles) tetrabutylphosphonium bromide catalyst under argon and the reaction mixture wsa heated to 250° C. at a rate of 2.0° C./min while removing volatile byproducts. A polysilane was obtained.

The three step devivatization process was carried out as in Example 1 for several different samples. For sample A, in the first step, the polysilane (190 g, 1.07 moles chlorine) was reacted with methyl Grignard reagent (22.4 g, 0.30 moles); in the second step, with vinyl Grignard reagent (45.9 g, 0.35 moles); and in the third step, with methyl Grignard reagent (33.6 g, 0.45 moles). The resulting vinyl-containing polysilane was treated as in Example 1 except that it was finally stripped at 160° C. and 30 mm Hg for 10 minutes. A solid vinyl-containing polysilane (90.3 g) was obtained which contained 47.9 percent silicon, 31.8 percent carbon, 6.75 percent hydrogen, 3.7 percent chlorine, and 4.3 percent vinyl. The oxygen content was not determined. The polysilane had a softening temperature of 50° C., a weight average molecular weight of 1554, a number average molecular weight of 944, and a viscosity of 142 poise at 150° C. A bulk polysilane sample was pyrolyzed to 1200° C.; the resulting ceramic material contained 56.2 percent silicon, 32.3 percent carbon, undetectable hydrogen, 0.7 percent oxygen, and less than 0.0095 percent chlorine.

For sample B, in the first derivative step, the polysilane (107.9 g, 0.609 moles chlorine) was reacted with methyl Grignard reagent (16.8 g, 0.225 moles); in the second step, with vinyl Grignard reagent (39.0 g, 0.297 moles); and in the third step, with methyl Grignard reagent (10.8 g, 0.144 moles). For samples C and D, in the first derivative step, the polysilane (213.9 g, 1.207 moles chlorine) was reacted with methyl Grignard reagent (33.3 g, 0.446 moles); in the second step, with vinyl Grignard reagent (69.5 g, 0.53 moles); and in the third step, with methyl Grignard reagent (125.9 g, 0.346 moles). The resulting vinyl-containing polysilanes were treated as in Example 1 except that they were finally stripped at 155° C. and 20 mm Hg for 33 (sample B), 15 (sample C), or 23 (sample D) minutes.

In run B, a solid vinyl-containing polysilane (87.2 g, 88.1 percent yield) was obtained which cfontained 45.2 percent silicon, 36.6 percent carbon, 8.72 percent hydrogen, 5.2 percent chlorine, and 3.0 percent vinyl. The oxygen content was not determined. The polysilane had a softening temperature of 73° C., a weight average molecular weightf of 2738, a number average molecular weight of 1272, and a viscosity of 780 poise at 160° C. Bulk polysilane samples were pyrolyzed to 1000° C. (TGA analysis) and 1200° C.; for the 1000° C. pyrolysis the ceramic yield was 67.1 percent; the ceramic material obtained from the 1200° C. pyrolysis contained 1.6 percent oxygen and 3.6 percent chlorine.

In run C, a solid vinyl-containing polysilane (83.9 g) was obtained which contained 41.0 percent silicon, 35.5 percent carbon, 8.35 percent hydrogen, 5.1 percent chlorine, and 3.1 percent vinyl. The oxygen content was not determined. The polysilane had a softening temperature of 54° C., a weight average molecular weight of 1846, a number average molecular weight of 1056, and a viscosity of 150 poise at 150° C. Bulk polysilane samples were pyrolyzed at 1000° C. (TGA analysis) and 1200° C.; for the 1000° C. pyrolysis the ceramic yield was 66.5 percent; the ceramic material from the 1200° C. pyrolysis contained 1.3 percent oxygen and 3.1 percent chlorine.

In run D, a solid vinyl-containing polysilane (86.1 g) was obtained which contained 45.7 percent silicon, 22.6 percent carbon, 6.43 percent hydrogen, 5.7 percent chlorine, and 2.9 percent vinyl. The oxygen content was not determined. The polysilane had a softening temperature of 62° C., a weight average molecular weight of 2111, a number average molecular weight of 1113, and a viscosity of 433 poise at 150° C. Bulk polysilane samples were pyrolyzed at 1000° C. (TGA analysis) and 1200° C.; for: the 1000° C. pyrolysis the ceramic yield was 65.0 percent; the ceramic material from the 1200° C. pyrolysis contained 57.2 percent silicon, 30.0 percent carbon, undetected hydrogen, 1.35 percent oxygen, and 3.1 percent chlorine.

EXAMPLE 4

A polysilane was prepared as in Example 1 except that the reaction mixture contained 436.0 g (2.0 moles) methylchlorodisilanes, 12.4 g (0.050 moles) n-octyltrichlorosilane, and 4.4 g (0.013 moles) tetrabutylphosphonium bromide catalyst under argon and the reaction mixture was heated to 250° C. at a rate of 2.0° C./min while removing volatile byproducts. A polysilane was obtained in 18.3 percent yield.

The three step devivatization process was carried out as in Example 1 for several different samples. For sample A, in the first step, the polysilane (82.0 g, 0.46 moles chlorine) was reacted with methyl Grignard reagent (13.5 g, 0.180 moles); in the second step, with vinyl Grignard reagent (32.8 g, 0.250 moles); and in the third step, with methyl Grignard reagent (9.0 g, 0.120 moles). The resulting vinyl-containing polysilane was treated as in Example 1 except that it was finally stripped at 160° C. and 30 mm Hg for 10 minutes. A solid vinyl-containing polysilane (50.3 g, 66.5 percent yield) was obtained which contained 43.4 percent silicon, 27.2 percent carbon, 6.86 percent hydrogen, 1.7 percent chlorine, and 4.2 percent vinyl. The oxygen content was not determined. The polysilane had a softening temperature of 70° C., a weight average molecular weight of 1790, a number average molecular weight of 1029, and a viscosity of 600 poise at 150° C. A bulk polysilane sample was pyrolyzed to 1200° C.; the resulting ceramic material contained 50.7 percent silicon, 31.4 percent carbon, undetected hydrogen, 0.74 percent oxygen, and 1.23 percent chlorine. Using a melt spinning technique, excellent fibers were obtained with average diameters of about 10 microns.

For samples B, C, and D, in the first derivative step, the polysilane (220.6 g, 1.24 moles) was reacted with methyl Grignard reagent (35.9 g, 0.48 moles); in the second step, with vinyl Grignard reagent (87.9 g, 0.67 moles); and in the third step, with methyl Grignard reagent (17.2 g, 0.23 moles). The resulting vinyl-containing polysilanes were treated as in Example 1 except that they were finally stripped at 155° C. and 20 mm Hg for 23 minutes (sample B) and 150° C. and 20 mm Hg for 10 (sample C) or 12 (sample D) minutes.

In run B, a solid vinyl-containing polysilane (88.9 g) was obtained which contained 47.4 percent silicon, 26.0 percent carbon, 6.1 percent hydrogen, 5.4 percent chlorine, and 2.5 percent vinyl. The oxygen content was not determined. The polysilane had a softening temperature of 100° C., a weight average molecular weight of 2531, a number average molecular weight of 1219, and a viscosity of greater than 1000 poise at 180° C. Bulk polysilane samples were pyrolyzed at 100° C. (TGA analysis) and 1200° C.; for the 1000° C. pyrolysis the ceramic yield was 69.9 percent; the ceramic material from the 1200° C. pyrolysis contained 1.8 percent oxygen and 4.9 percent chlorine.

In run C, a solid vinyl-containing polysilane (80.7 g) was obtained which contained 47.1 percent silicon, 23.1 percent carbon, 5.8 percent hydrogen, 5.5 percent chlorine, and 2.7 percent vinyl. The oxygen content was not determined. The polysilane had a softening temperature of 55° C., a weight average molecular weight of 1684, a number average molecular weight of 1015, and a viscosity of 640 poise at 150° C. Bulk polysilane samples were pyrolyzed at 1000° C. (TGA analysis) and 1200° C.; for the 1000° C. pyrolysis the ceramic yield was 69.8 percent; the ceramic material from the 1200° C. pyrolysis contained 28.8 percent carbon, undetected hydrogen, 2.6 percent oxygen, and 3.8 percent chlorine.

In run D, a solid vinyl-containing polysilane ((57.7 g) was obtained which contained 46.8 percent silicon, 21.6 percent carbon, 6.19 percent hydrogren, 5.9 percent chlorine, and 2.6 percent vinyl. The oxygen content was not determined. The polysilane had a softening temperature of 74° C., a weight average molecular weight of 1963, a number average molecular weight of 1064, and a viscosity of 990 poise at 150° C. Bulk polysilane samples were pyrolyzed at 1000° C. (TGA analysis) and 1200° C.; for the 1000° C. pyrolysis the ceramic yield was 69.3 percent; the ceramic material from the 1200° C. pyrolysis contained 41.7 percent silicon, 30.0 percent carbon, undetectable hydrogen, 1.18 percent oxygen, and 3.5 percent chlorine.

For samples E and F, in the first derivative step, the polysilane (151 g, 0.85 moles chlorine) was reacted with methyl Grignard reagent (26.2 g, 0.35 moles); in the second step, with vinyl Grignard reagent (60.4 g, 0.46 moles); and in the third step, with methyl Grignard reagent (9.7 g, 0.13 moles). The resulting vinyl-containing polysilanes were treated as in Example 1 except that they were finally stripped at 160° C. and 30 mm Hg for 5 (sample E) or 10 (sample F) minutes.

In run E, a solid vinyl-containing polysilane (55.1 g) was obtained which contained 45.6 percent silicon, 31.5 percent carbon, 7.46 percent hydrogen, 4.2 percent chlorine, and 2.9 percent vinyl. The oxygen content was not determined. The polysilane had a softening temperature of 74° C., a weight average molecular weight of 1270, a number average molecular weight of 770, and a viscosity of 570 poise at 150° C. A bulk polysilane sample was pyrolyzed to 1200° C.; the resulting ceramic material contained 1.1 percent oxygen and 3.0 percent chlorine.

In run F, a solid vinyl-containing polysilane (59.3 g) was obtained which contained 47.2 percent silicon, 35.6 percent carbon, 8.88 percent hydrogen, 4.1 percent chlorine, and 3.1 percent vinyl. The oxygen content was not determined. The polysilane had a softening temperature of 73° C., a weight average molecular weight of 1287, a number average molecular weight of 786, and a viscosity of 925 poise at 150° C. A bulk polysilane sample was pyrolyzed to 1200° C.; the resulting ceramic material contained 1.1 percent oxygen and 3.0 percent chlorine.

For samples G and H, in the first derivative step, the polysilane (170 g, 0.96 moles chlorine) was reacted with methyl Grignard reagent (26.9 g, 0.36 moles); in the second step, with vinyl Grignard reagent (52.5 g, 0.40 moles); and in the third step, with methyl Grignard reagent (22.4 g, 0.30 moles). The resulting vinyl-containing polysilanes were treated as in Example 1 except that sample G was finally stripped at 155° C. and 40 mm Hg for 3 minutes and sample H was finally stripped at 180° C. and 20 mm Hg for 1 minute.

In run G, a solid vinyl-containing polysilane (72.3 g) was obtained which contained 52.7 percent silicon, 34.8 percent carbon, 7.90 percent hydrogen, 3.7 percent chlorine, and 2.5 percent vinyl. The oxygen content was not determined. The polysilane had a softening temperature of 43° C., a weight average molecular weight of 1072, a number average molecular weight of 726, and a viscosity of 575 poise at 150° C.

In run H, a solid vinyl-containing polysilane (80.2 g) was obtained which contained 48.9 percent silicon, 35.5 percent carbon, 7.96 percent hydrogen, and 2.2 percent vinyl. Neither the oxygen nor chlorine content was determined. The polysilane had a softening temperature of 82° C., a weight average molecular weight of 1310, a number average molecular weight of 788, and a viscosity of greater than 1000 poise at 160° C.

EXAMPLE 5

A polysilane was prepared as in Example 1 except that the reaction mixture contained 436.0 g (2.0 moles) methylchlorodisilanes, 12.4 g (0.050 moles) n-octyltrichlorosilane, and 4.4 g (0.013 moles) tetrabutylphosphonium bromide catalst under argon and the reaction mixture was heated to 220° C. at a rate of 2.0° C./min while removing volatile byproducts. A polysilane was obtained in 21.6 percent yield.

The three step devivatization process was carried out as in Example 1 for several different samples. For sample A, in the first step, the polysilane (97.0 g, 0.55 moles chlorine) was reacted with methyl Grignard reagent (15.0 g, 0.200 moles); in the second step, with vinyl Grignard reagent (39.4 g, 0.300 moles); and in the third step, with methyl Grignard reagent (7.5 g, 0.100 moles). The resulting vinyl-containing polysilane was treated as in Example 1 except that it was finally stripped at 160° C. and 25 mm Hg for 5 minutes. A solid vinyl-containing polysilane (55.2 g, 61.7 percent yield) was obtained which contained 45.7 percent silicon, 37.2 percent carbon, 8.27 percent hydrogen, 0.58 percent chlorine, and 5.3 percent vinyl. The oxygen content was not determined. The polysilane had a softening temperature of 46° C., a weight average molecular weight of 1183, a number average molecular weight of 715, and a viscosity of 170 poise at 150° C.

For sample B, in the first step, the polysilane (102.3 g, 0.58 moles chlorine) was reacted with methyl Grignard reagent (15.7 g, 0.210 moles); in the second step, with vinyl Grignard reagent (36.7 g, 0.280 moles); and in the third step, with methyl Grignard reagent (10.5 g, 0.140 moles). The resulting vinyl-containing polysilane was treated as in Example 1 except that it was finally stripped at 160° C. and 30 mm Hg for 5 minutes. A solid vinyl-containing polysilane (62.7 g, 66.8 percent yield) was obtained which contained 46.6 percent silicon, 38.0 percent carbon, 8.59 percent hydrogen, 5.8 percent chlorine, and 4.8 percent vinyl. The oxygen content was not determined. The polysilane had a softening temperature of 47° C., a weight average molecular weight of 1151, a number average molecular weight of 751 and a viscosity of 130 poise at 150° C.

EXAMPLE 6

A polysilane was prepared as in Example 1 except that the reaction mixture contained 436.0 g (2.0 moles) methylchlorodisilanes, 12.4 g (0.050 moles) n-octyltrichlorosilane, and 4.4 g (0.013 moles) tetrabutylphosphonium bromide catalyst under argon and the reaction mixture wsa heated to 230° C. at a rate of 2.0° C./min while removing volatile byproducts. A polysilane was obtained in 22.7 percent yield.

The three step devivatization process was carried out as in Example 1 for several different samples. For samples A and B, in the first step, the polysilanes (101.7 g, 0.57 moles chlorine) were reacted with methyl Grignard reagent (15.7 g, 0.210 moles); in the second step, with vinyl Grignard reagent (36.7 g, 0.280 moles); and in the third step, with methyl Grignard reagent (10.5 g, 0.140 moles). The resulting vinyl-containing polysilane was treated as in Example 1 except samples A and B were finally stripped at 160° C. and 30 mm Hg for 15 and 8 minutes, respectively.

For sample A, a solid vinyl-containing polysilane (56.7 g, 60.7 percent yield) was obtained which contained 47.3 percent silicon, 36.2 percent carbon, 8.69 percent hydrogen, 5.6 percent chlorine, and 5.3 percent vinyl. The oxygen content was not determined. The polysilane had a softening temperature of 67° C., a weight average molecular weight of 1319, a number average molecular weight of 768, and a viscosity of 870 poise at 150° C.

For sample B, a solid vinyl-containing polysilane (51.3 g, 55.2 percent yield) was obtained which contained 47.0 percent silicon, 42.6 percent carbon, 9.74 percent hydrogen, 5.2 percent chlorine, and 5.0 percent vinyl. The oxygen content was not determined. The polysilane had a softening temperature of 62° C., a weight average molecular weight of 1541, a number average molecular weight of 830, and a viscosity of 520 poise at 150° C.

Fibers were melt spun at about 113° C. using polysilane B and the same procedure as in Example 1; the resulting fibers had an average diameter of about 23 microns. Fibers sample B-1 received no on-line or post cure UV irradiation; fibers sample B-2 received 0.36 seconds of on-line cure and six minutes of one-sided post cure using the same procedures as described in Example 1. The fiber samples were then pyrolyzed to 1200° C. at a rate of 3.0° C./min under an argon atmosphere to produce ceramic fibers. Ceramic fibers from B-1 were fused after pyrolysis but could be separated into individual fibers (average diameter of 9.7 microns; tensile strength of 67 Ksi; and modulus of 8.1 Msi). Ceramic fibers from B-2 were slightly fused after pyrolysis but could be separated into individual fibers (average diameter of 19.6 microns; tensile strength of 187 Ksi; and modulus of 18.6 Msi).

For sample C, in the first step, the polysilane (100.1 g, 0.56 moles chlorine) was reacted with methyl Grignard reagent (20.2 g, 0.270 moles); in the second step, with vinyl Grignard reagent (28.9 g, 0.220 moles); and in the third step, with methyl Grignard reagent (10.5 g, 0.140 moles). The resulting vinyl-containing polysilane was treated as in Example 1 except that it was finally stripped at 160° C. and 30 mm Hg for 10 minutes. A solid vinyl-containing polysilane (48.2 g, 53.0 percent yield) was obtained which contained 46.6 percent silicon, 35.7 percent carbon, 9.3 percent hydrogen, 6.0 percent chlorine, and 3.7 percent vinyl. The oxygen content was not determined. The polysilane had a softening temperature of 60° C., a weight average molecular weight of 1201, a number average molecular weight of 774, and a viscosity of 190 poise at 150° C.

EXAMPLE 7

A polysilane was prepared as in Example 1 except that the reaction mixture contained 436.0 g (2.0 moles) methylchlorodisilanes, 18.6 g (0.075 moles) n-octyltrichlorosilane, and 4.4 g (0.013 moles) tetrabutylphosphonium bromide catalyst under argon and the reaction mixture was heated to 235° C. at a rate of 2.0° C./min while removing volatile byproducts. A polysilane was obtained.

The three step derivatization process was carried out as in Example 1. In the first step, the polysilane (93.8 g, 0.53 moles chlorine) was reacted with a mixture of methyl Grignard reagent (15.7 g, 0.210 moles); and vinyl Grignard reagent (6.6 g, 0.05 moles); in the second step, with vinyl Grignard reagent (26.2 g, 0.200 moles); and in the third step, with methyl Grignard reagent (9.0 g, 0.120 moles). The resulting vinyl-containing polysilane was treated as in Example 1 except it was finally stripped at 155° C. and 35 mm Hg for 10 minutes.

A solid vinyl-containing polysilane (63.9 g, 74.3 percent yield) was obtained which contained 39.8 percent silicon, 35.8 percent carbon, 8.38 percent hydrogen, 5.4 percent chlorine, and 5.0 percent vinyl. The oxygen content was not determined. The polysilane had a softening temperature of 44° C., a weight average molecular weight of 1305, a number average molecular weight of 768, and a viscosity of 160 poise at 130° C.

Fibers were melt spun at about 120° C. using this polysilane and the same procedure as in Example 1 except that a 6 mil spinneret was used; the resulting fibers had an average diameter of about 20 to 30 microns. Fibers were cured on-line with a residence time of 0.56 seconds using the same procedure as in Example 1. There was no post-cure irradiation. The fibers were then pyrolyzed to 1200° C. at a rate of 3.0° C./min under an argon atmosphere to produce ceramic fibers. The resulting ceramic fibers were somewhat fused after pyrolysis but could be separated into individual fibers (average diameter of 24.9 microns; tensile strength of 93 Ksi; and modulus of 12.9 Msi).

EXAMPLE 8

A polysilane was prepared as in Example 1 except that the reaction mixture contained 436.0 g (2.0 moles) methylchlorodisilanes, 10.6 g (0.043 moles) n-octyltrichlorosilane, and 4.4 g (0.013 moles) tetrabutylphosphonium bromide catalyst under argon and the reaction mixture was heated to 235° C. at a rate of 2.0° C./min while removing volatile byproducts. A polysilane was obtained in 21.7 percent yield.

The three step derivatization process was carried out as in Example 1. In the first step, the polysilane (96.7 g, 0.56 moles chlorine) was reacted with a mixture of methyl Grignard reagent (15.7 g, 0.210 moles) and vinyl Grignard reagent (6.6 g, 0.05 moles); in the second step, with vinyl Grignard reagent (26.2 g, 0.200 moles); and in the third step, with methyl Grignard reagent (10.5 g, 0.140 moles). The resulting vinyl-containing polysilane was treated as in Example 1 except it was finally stripped at 155° C. and 40 mm Hg for 6 minutes.

A solid vinyl-containing polysilane (59.3 g, 66.9 percent yield) was obtained which contained 47.7 percent silicon, 35.2 percent carbon, 8.13 percent hydrogen, 4.9 percent chlorine, and 4.6 percent vinyl. The oxygen content was not determined. The polysilane had a softening temperature of 53° C., a weight average molecular weight of 1110, a number average molecular weight of 677, and a viscosity of 410 poise at 140° C.

EXAMPLE 9

A polysilane was prepared as in Example 1 except that the reaction mixture contained 872.0 g (4.0 moles) methylchlorodisilanes, 24.8 g (0.100 moles) n-octyltrichlorosilane, and 8.7 g (0.026 moles) tetrabutylphosphonium bromide catalyst under argon and the reaction mixture wsa heated to 235° C. at a rate of 2.0° C./min while removing volatile byproducts. A polysilane was obtained in 23.9 percent yield.

The three step derivatization process was carried out as in Example 1. In the first step, the polysilane (216.0 g, 1.22 moles chlorine) was reacted with a mixture of methyl Grignard reagent (31.4 g, 0.420 moles) and vinyl Grignard reagent (13.1 g, 0.100 moles); in the second step, with vinyl Grignard reagent (52.5 g, 0.400 moles); and in the third step, with methyl Grignard reagent (29.9 g, 0.400 moles). The resulting vinyl-containing polysilane wsa treated as in Example 1 except that it was finally stripped at 160° C. and 30 mm Hg for 10 minutes.

A solid vinyl-containing polysilane (116.3 g, 59.0 percent yield) was obtained which contained 47.6 percent silicon, 37.7 percent carbon, 9.30 percent hydrogen, 0.6 percent chlorine, and 7.7 percent vinyl. The oxygen content was not determined. The polysilane had a softening temperature of 43° C. and a viscosity of 102 poise at 140° C.

Fibers were melt spun at about 115° C. using this polysilane and the same procedure as in Example 1; the resulting fibers had an average diameter of about 20 microns. Fibers were cured online with a residence time of 0.22 seconds using the same procedure as in Example 1. The fibers were then post cured for 60 minutes (15 minutes per side) using the four-side procedure of Example 1. The fibers were then pyrolyzed to 1200° C. at a rate of 3.0° C./min under an argon atmosphere to produce ceramic fibers. The resulting ceramic fibers were slightly fused after pyrolysis but could be separated into individual fibers (average diameter of 15.3 microns; tensile strength of 175 Ksi; and modulus of 30.9 Msi).

That which is claimed:

1. A method of preparing a vinyl-containing first polysilane having the general formula

$$[RSi][R_2Si]$$

where there are present 0 to 60 mole percent [$R_2Si$] units and 40 to 100 mole percent [RSi] units, where R is an alkyl radical containing 1 to 8 carbon atoms, and where the remaining bonds on silicon are attached to other silicon atoms, —R′ groups, and vinyl groups, where R′ is an alkyl group containing 1 to 8 carbon atoms or a phenyl group, said method consisting of reacting under anhydrous conditions in the presence of a solvent a second polysilane with chlorine or bromine endblocking groups of general formula

$$[RSi][R_2Si]$$

where there are present 0 to 60 mole percent [$R_2Si$] units and 40 to 100 mole percent [RSi] units, where R is an alkyl radical containing 1 to 8 carbon atoms, and where the remaining bonds on silicon are attached to other silicon atoms and chlorine or bromine atoms with (1) a Grignard reagent of general formula R′MgX′ or an organolithium compound of general formula R′Li at a temperature of 0 to 120° C., followed by reaction with (2) a vinyl-containing Grignard reagent of general formula ($CH_2$=CH)MgX′ or vinyllithium at a temperature of 0 to 120° C., followed by reaction with (3) a Grignard reagent of general formula R′MgX′ or an organolithium reagent of general formula R′Li at a temperature of 0° to 120° C. where R′ is an alkyl radical with 1 to 8 carbon atoms or a phenyl radical and X′ is chlorine, bromine, or iodine and thereafter removing the solvent at a temperature of less than about 150° C. to obtain the vinyl-containing first polysilane.

2. A method as defined in claim 1 where the remaining bonds on silicon in the second polysilane are attached to other silicon atoms and chlorine atoms and where R in both the first and second polysilanes is a methly group.

3. A method as defined in claim 2 where the second polysilane is reacted with (1) a Grignard reagent of general formula R′MgX, with (2) a Grignard reagent of general formula (CH$_2$=CH)MgX, and with (3) a Grignard reagent of general formula R'MgX.

4. A method as defined in claim 3 where the second polysilane is reacted with (1) a Grignard reagent of general formula (CH$_3$)MgX, with (2) a Grignard reagent of general formula (CH$_2$=CH)MgX, and with (3) a Grignard reagent of general formula (CH$_3$)MgX.

5. A method as defined in claim 3 where the Grignard reagent in step (1) is present in an amount sufficient to react with 10 to 40 weight percent of the replaceable chlorine in the second polysilane, where the Grignard reagent in step (2) is present in an amount sufficient to react with 30 to 70 weight percent of the replaceable chlorine in the second polysilane, and where the Grignard reagent in step (3) is present in an amount in excess of that required to react with any replaceable chlorine in the second polysilane remaining after steps (1) and (2).

6. A method as defined in claim 3 where the Grignard reagent in step (1) is present in an amount sufficient to react with 25 to 40 weight percent of the replaceable chlorine in the second polysilane, where the Grignard reagent in step (2) is present in an amount sufficient to react with 40 to 60 weight percent of the replaceable chlorine in the second polysilane, and where the Grignard reagent in step (3) is present in an amount in excess of that required to react with any replaceable chlorine in the second polysilane remaining after steps (1) and (2).

7. A method as defined in claim 3 where the Grignard reagent in step (1) is present in an amount sufficient to react with about 33 weight percent of the replaceable chlorine in the second polysilane, where the Grignard reagent in step (2) is present in an amount sufficient to react with about 50 weight percent of the replaceable chlorine in the second polysilane, and where the Grignard reagent in step (3) is present in an amount in excess of that required to react with any replaceable chlorine in the second polysilane remaining after steps (1) and (2).

8. A method as defined in claim 2 where the second polysilane is reacted with (1) an organolithium compound of general formula R'Li, with (2) vinyllithium, and with (3) an organolithium compound of general formula R'Li.

9. A method as defined in claim 8 where the second polysilane is reacted with (1) methyllithium, with (2) vinyllithium, and with (3) methyllithium.

10. A method as defined in claim 8 where the organolithium compound in step (1) is present in an amount sufficient to react with 10 to 40 weight percent of the replaceable chlorine in the second polysilane, where vinyllithium in step (2) is present in an amount sufficient to react with 30 to 70 weight percent of the replaceable chlorine in the second polysilane, and where the organolithium compound in step (3) is present in an amount in excess of that required to react with any replaceable chlorine in the second polysilane remaining after steps (1) and (2).

11. A method as defined in claim 8 where the organolithium compound in step (1) is present in an amount sufficient to react with 25 to 40 weight percent of the replaceable chlorine in the second polysilane, where vinyllithium in step (2) is present in n amount sufficient to react with 40 to 60 weight percent of the replaceable chlorine in the second polysilane, and where the organolithium compound in step (3) is present in an amount in excess of that required to react with any replaceable chlorine in the second polysilane remaining after steps (1) and (2).

12. A method as defined in claim 8 where the organolithium compound in step (1) is present in an amount sufficient to react with about 33 weight percent of the replaceable chlorine in the second polysilane, where vinyllithium in step (2) is present in an amount sufficient to react with about 50 weight percent of the replaceable chlorine in the second polysilane, and where the organolithium compound in step (3) is present in an amount in excess of that required to react with any replaceable chlorine in the second polysilane remaining after steps (1) and (2).

13. A method as defined in claim 2 where the second polysilane is reacted with (1) an organolithium compound of general formula R'Li, with (2) a Grignard reagent of general formula (CH$_2$=CH)MgX, and with (3) an organolithium compound of general formula R'Li.

14. A method as defined in claim 13 where the second polysilane is reacted with (1) methyllithium, with (2) a Grignard reagent of general formula (CH$_2$=CH)MgX, and with (3) methyllithium.

15. A method as defined in claim 13 where the organolithium compound in step (1) is present in an amount sufficient to react with 10 to 40 weight percent of the replaceable chlorine in the second polysilane, where the Grignard reagent in step (2) is present in an amount sufficient to react with 30 to 70 weight percent of the replaceable chlorine in the second polysilane, and where the organolithium compound in step (3) is present in an amount in excess of that required to react with any replaceable chlorine in the second polysilane remaining after steps (1) and (2).

16. A method as defined in claim 13 where the organolithium compound in step (1) is present in an amount sufficient to react with 25 to 40 weight percent of the replaceable chlorine in the second polysilane, where the Grignard reagent in step (2) is present in an amount sufficient to react with 40 to 60 weight percent of the replaceable chlorine in the second polysilane, and where the organolithium compound in step (3) is present in an amount in excess of that required to react with any replaceable chlorine in the second polysilane reamining after steps (1) and (2).

17. A method as defined in claim 13 where the organolithium compound in step (1) is present in an amount sufficient to react with about 33 weight percent of the replaceable chlorine in the second polysilane, where the Grignard reagent in step (2) is present in an amount sufficient to react with about 50 weight percent of the replaceable chlorine in the second polysilane, and where the organolithium compound in step (3) is present in an amount in excess of that required to react with any replaceable chlorine in the second polysilane remaining after steps (1) and (2).

18. A method of preparing a vinyl-containing first polysilane having the general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units, where R is an alkyl radical containing 1 to 8 carbon atoms, where R" is selected from the group consisting of alkyl radicals containing at least six carbon atoms, phenyl radicals, and radicals of the formula $A_yX_{(3-y)}Si(CH_2)_z-$ where A is a hydrogen atom or an alkyl radical containing 1 to 4 carbon atoms, y is an integer equal to 0 to 3, X is chlorine or bromine, and z is an integer greater than or equal to 1, and where the remaining groups on silicon are attached to other silicon atoms, —R' groups, and vinyl groups, where R' is an alkyl group containing 1 to 8 carbon atoms or a phenyl group, said method consisting of reacting under anhydrous conditions in the presence of a solvent a second polysilane with chlorine or bromine endblocking groups of general formula

[RSi][R$_2$Si][R"Si]

where there are present 0 to 40 mole percent [R$_2$Si] units, 0.1 to 99.9 mole percent [RSi] units, and 0.1 to 99.9 mole percent [R"Si] units, where R is an alkyl radical containing 1 to 8 carbon atoms, where R" is selected from the group consisting of alkyl radicals containing at lease six carbon atoms, phenyl radicals, and radicals of the formula $A_yX_{(3-y)}Si(CH_2)_z-$ where A is a hydrogen atom or an alkyl radical containing 1 to 4 carbon atoms, y is an integer equal to 0 to 3, X is chlorine or bromine, and z is an integer greater than or equal to 1, and where the remaining bonds on silicon are attached to other silicon atoms and chlorine or bromine atoms with (1) a Grignard reagent of general formula R'MgX' or an organolithium compound of general formula R'Li at a temperature of 0° to 120° C., followed by reaction with (2) a vinyl-containing Grignard reagent of general formula (CH$_2$=CH)MgX' or vinyllithium at a temperature of 0° to 120° C., followed by reaction with (3) a Grignard reagent of general formula R'MgX' or an organolithium reagent of general formula R'Li at a temperature of 0° to 120° C. where R' is an alkyl radical with 1 to 8 carbon atoms or a phenyl radical and X' is chlorine, bromine, or iodine and thereafter removing the solvent at a temperature of less than about 150° C. to obtain the vinyl-containing first polysilane.

19. A method as defined in claim 18 where the first polysilane and the second polysilane each contain 0 to 40 mole percent of [R$_2$Si] units, 40 to 99 mole percent [RSi] units, and 1 to 30 mole percent [R"Si] units.

20. A method as defined in claim 19 where the first polysilane and the second polysilane each contain 0 to 10 mole percent of [R$_2$Si] units, 80 to 99 mole percent [RSi] units, and 1 to 20 mole percent [R"Si] units.

21. A method as defined in claim 19 where the Grignard reagent or organolithium compound in step (1) is present in an amount sufficient to react with 10 to 40 weight percent of the replaceable chlorine or bromine in the second polysilane, where the Grignard reagent or vinyllithium in step (2) is present in an amount sufficient to react with 30 to 70 weight percent of the replaceable chlorine or bromine in the second polysilane, and where the Grignard reagent or organolithium compound in step (3) is present in an amount in excess of that required to react with any replaceable chlorine or bromine in the second polysilane remaining after steps (1) and (2).

22. A method as defined in claim 20 where the Grignard reagent or organolithium compound in step (1) is present in an amount sufficient to react with 10 to 40 weight percent of the replaceable chlorine or bromine in the second polysilane, where the Grignard reagent or vinyllithium in step (2) is present in an amount sufficient to react with 30 to 70 weight percent of the replaceable chlorine or bromine in the second polysilane, and where the Grignard reagent or organolithium compound in step (3) is present in an amount in excess of that required to react with any replaceable chlorine or bromine in the second polysilane remaining after steps (1) and (2).

23. A method as defined in claim 21 where the Grignard reagent or organolithium compound in step (1) is present in an amount sufficient to react with 25 to 40 weight percent of the replaceable chlorine or bromine in the second polysilane, where the Grignard reagent or vinyllithium in step (2) is present in an amount sufficient to react with 40 to 60 weight percent of the replaceable chlorine or bromine in the second polysilane, and where the Grignard reagent or organolithium compound in step (3) is present in an amount in excess of that required to react with any replaceable chlorine or bromine in the second polysilane remaining after steps (1) and (2).

24. A method as defined in claim 22 where the Grignard reagent or organolithium compound in step (1) is present in an amount sufficient to react with 25 to 40 weight percent of the replaceable chlorine or bromine in the second polysilane, where the Grignard reagent or vinyllithium in step (2) is present in an amount sufficient to react with 40 to 60 weight percent of the replaceable chlorine or bromine in the second polysilane, and where the Grignard reagent or organolithium compound in step (3) is present in an amount in excess of that required to react with any replaceable chlorine or bromine in the second polysilane remaining after steps (1) and (2).

25. A method as defined in claim 23 where the Grignard reagent or organolithium compound in step (1) is present in an amount sufficient to react with about 33 weight percent of the replaceable chlorine or bromine in the second polysilane, where the Grignard reagent or vinyllithium in step (2) is present in an amount sufficient to react with about 50 weight percent of the replaceable chlorine or bromine in the second polysilane, and where the Grignard reagent or organolithium compound in step (3) is present in an amount in excess of that required to react with any replaceable chlorine or bromine in the second polysilane remaining after steps (1) and (2).

26. A method as defined in claim 24 where the Grignard reagent or organolithium compound in step (1) is present in an amount sufficient to react with about 33 weight percent of the replaceable chlorine or bromine in the second polysilane, where the Grignard reagent or vinyllithium in step (2) is present in an amount sufficient to react with about 50 weight percent of the replaceable chlorine or bromine in the second polysilane, and where the Grignard reagent or organolithium compound in step (3) is present in an amount in excess of that required to react with any replaceable chlorine or bromine in the second polysilane remaining after steps (1) and (2).

* * * * *